United States Patent [19]
Bray

[11] Patent Number: 4,869,364
[45] Date of Patent: Sep. 26, 1989

[54] CONTAINER FOR THIN OBJECTS

[76] Inventor: Christopher Bray, Apt. 903, 50 Emmerson Ave., Ottawa, Ontario, Canada, K1Y 4P7

[21] Appl. No.: 219,913

[22] Filed: Jul. 15, 1988

[51] Int. Cl.⁴ .............................................. B65D 85/57
[52] U.S. Cl. .................................... 206/232; 206/444; 206/472
[58] Field of Search .............. 206/232, 311, 387, 444, 206/472

[56] References Cited

U.S. PATENT DOCUMENTS

| | | | |
|---|---|---|---|
| 3,641,684 | 2/1972 | Paige | 206/232 X |
| 4,132,311 | 1/1979 | Glinert | 206/387 |
| 4,159,769 | 7/1979 | Hatten et al. | 206/527 |
| 4,253,571 | 3/1981 | Keohan | 206/444 |
| 4,381,836 | 5/1983 | Rivkin et al. | 206/387 |
| 4,449,628 | 5/1984 | Egly et al. | 206/45.18 |
| 4,469,397 | 9/1984 | Shaw et al. | 350/96.15 |
| 4,479,577 | 10/1984 | Eichner et al. | 206/45.18 |
| 4,518,275 | 5/1985 | Rauch et al. | 206/387 X |
| 4,570,796 | 2/1986 | Groom | 206/449 |
| 4,588,321 | 5/1986 | Egly | 206/444 |
| 4,635,797 | 1/1987 | Bankier | 206/387 X |
| 4,640,413 | 2/1987 | Kaplan et al. | 206/444 X |
| 4,641,750 | 2/1987 | Johnson et al. | 206/472 X |
| 4,693,364 | 9/1987 | Wakelin | 206/45.18 |
| 4,708,239 | 11/1987 | Bourbon | 206/45.13 |
| 4,730,727 | 3/1988 | Petroff | 206/311 |

Primary Examiner—Stephen M. Hepperle
Attorney, Agent, or Firm—Price, Heneveld, Cooper, DeWitt & Litton

[57] ABSTRACT

A packaging and storage container for magnetic diskettes and related documentation comprising a retangular container having two parts bound together by a connecting spine and opening like a book. The one side of the container holds three and one half and/or five and one quarter inch diskettes while the opposite side is adapted to hold the documentation which normally accompanies program diskettes. The container serves as an attractive package for the software and documentation during the marketing and distribution process. It also serves as the filing location for both the program diskette(s) and the documentation after the sale of the product.

14 Claims, 1 Drawing Sheet

CONTAINER FOR THIN OBJECTS

The present invention relates to packaging and storage containers and more particularly to a container for packaging and storing thin flat objects such as magnetic diskettes and their accompanying documentation.

BACKGROUND OF THE INVENTION/ PRIOR ART

Computer diskettes are widely available and increasingly popular as an exchange medium for vendable software. Diskettes are generally available in either three and one half inch or five and one quarter inch sizes. Although the three and one half inch model was introduced after the five and one quarter inch model, it has gained relatively wide acceptance especially since the introduction of lap-top personal computers which are generally equipped with three and one half inch diskette drives.

Computer diskettes are known to be relatively sensitive media which must be packaged and stored with care to prevent damage and the resulting loss of valuable software. Authors and producers of software marketed via diskette require secure and attractive packaging to protect their product through the distribution and marketing process. As well, the packaging should ideally serve as a permanent filling container for the software diskette(s) and related documentation in a post-sale environment. A secure post-sale diskette filing system reduces warranty claims and generally increases customer satisfaction.

Several patents have issued for magnetic diskette filing containers. Among the most notable of these are U.S. Pat. Nos. 4,449,628, 4,693,364 and 4,479,577. These patents disclose generally slim rectangular containers which store a single size of diskette and, on being opened, display the stored diskettes for selection. Although these containers are satisfactory for filing and storing diskettes, they are not adapted to serve as marketing containers and do not interchangably accomodate different sized diskettes. Software diskettes are currently marketed in a variety of envelopes, boxes and pouches, however, there exists a need for an attractive diskette and documentation package which is capable of effectively protecting either three and one half or five and one quarter inch diskettes and related documentation in both pre-sale and post-sale environments.

SUMMARY OF THE INVENTION

In accordance with the present invention, a container is disclosed which is particularly adapted to the attractive packaging of different sizes of computer diskettes and related documentation for the marketing and storage thereof. The container comprises a pair of substantially rigid panels which are flexibly joined along opposed edges to respective parallel sides of an elongated rigid spine member. Attached to each panel is a molded plastic tray which complementarily engages the opposing tray when the container is in a closed condition. One of the two trays is formed with a first recess to accomodate a larger size of diskette and, within the first recess, a second recess to accomodate a smaller diskette size. The second tray contains one or more recesses formed to accommodate any documentation which may accompany the diskette(s).

In its closed condition, the container resembles a book and may have pockets provided on an outside cover to display the vendor's trade information.

In its open condition, each tray of the container is exposed to permit the removal of the diskette(s) and/or the documentation. The two trays disengagably interlock when the container is closed to prevent the unintentional opening thereof.

More particularly, the present invention comprises a container for storing and marketing at least two distinct sizes of generally flat articles such as magnetic diskettes and, optionally, printed material comprising:

an outer cover having a pair of spaced apart panels pivotally interconnected along adjacent edges to opposed sides of a spine member;

a pair of shallow trays respectively secured to said panels in an opposing relationship, a first of said trays having at least two recesses adapted to accommodate said distinctly sized flat articles and the second said tray optionally having at least one recess adapted to accommodate printed matter;

retaining means to removably retain said articles in said recesses; and locking means to releasably lock said first tray to said second tray when said container is in a closed condition.

DESCRIPTION OF THE DRAWINGS

A preferred embodiment of the present invention will now be explained by way of example only and with reference to the following drawings wherein.

DETAILED DESCRIPTION OF THE INVENTION

Figure 1:
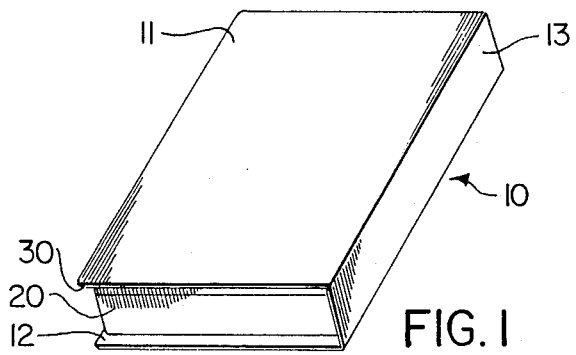
FIG. 1 is a perspective view of a container in accordance with the invention in a closed condition.

Referring to the drawings, FIG. 1 illustrates a perspective view of a container in accordance with the invention in a closed condition. As is apparent, the container generally referred to by the reference 10 resembles a book when it is closed. The container comprises a pair of outer supporting cover panels 11 and 12 which are interconnected by a spine 13.

Figure 2:
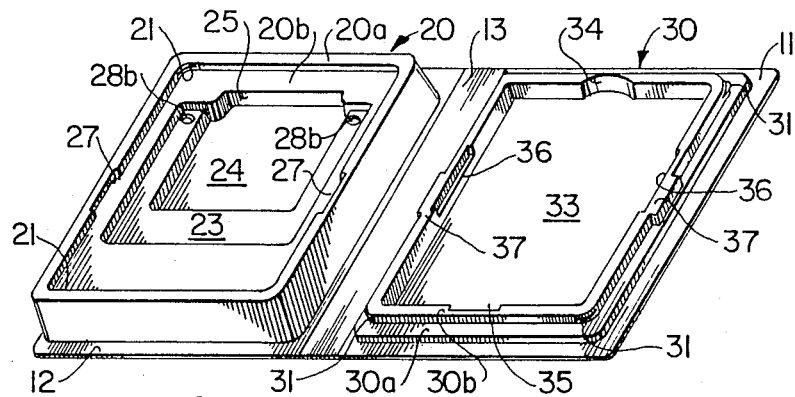
FIG. 2 is a perspective view of the container of FIG. 1 in an open condition illustrating the basic structure of the two trays.

In FIG. 2 the container is illustrated in an open condition. The container comprises a left hand tray 20 and a right hand tray 30, respectively extending from the cover panels 11 and 12. Trays 20 and 30 are preferably formed from vacuum molded polyvinylchloride, however, any durable light weight moldable material is equally satisfactory. The tray 20 comprises vertical sides which terminate in a narrow circumferential ridge 20a. A substantially planar surface 20b surrounds a substantially rectangular recessed area 23, in which there is located a smaller substantially rectangular recessed area 24. Recessed area 23 is sized to accommodate five and one quarter inch magnetic diskettes while recessed area 24 accommodates three and one half inch magnetic diskettes. A finger space 25 is provided to facilitate the removal of magnetic diskettes from the recesses 23 and 24. Circular depressions 28b located on opposed sides of recess 23 serve as attachment points for Velcro (trademark) hook and loop fastener buttons, the purpose of which will be explained in detail hereinafter.

The right hand tray 30 comprises relatively low vertical sides which terminate in a narrow ledge 30a. A second relatively low vertical wall rises from the inner edge of ledge 30a and terminates in a second ledge 30b forming the top of the tray. A substantially rectangular recess 33 serves to store printed documentation which generally accompanies the diskettes stored in either recess 23 or 24 of tray 20. A finger notch 34 on the top end of recess 33 provides space to facilitate the removal of documentation from the recess 33. The opposing notches 36 on the inner side walls of recess 33 and a notch 35 on the end wall of the recess opposite to the finger notch 34 serve as an attachment point for a retaining strap which is explained in detail below. Opposing rectangular projections 37 are provided on the exterior longitudinal edges of ridge 30b and are complementary with respective notches 27 in the longitudinal inner edges of tray 20. When the two trays are brought to a closed condition, projections 37 frictionally engage recesses 27 to inhibit the opening of the container. In addition, rib 30b is shaped complementary with ridge 20a, so that the outside edge of rib 30b contacts the inside surfaces of ridge 20a in a similar frictional engagement. In order to reinforce the closure of the two trays, complementary narrow linear ridges 31 in the corner regions of the tray 30 engage narrow linear grooves 21 in each corner region of tray 20. These snap fit connections are easily separated while providing excellent resistance to the unintentional opening of the container.

The supporting panels 11 and 12 for the trays and the spine 13 are preferably formed from one hundred point pasted chip board, or a similar fibre board, which is covered inside and out with fourteen gage vinyl. The interior vinyl covering is adapted to fit around the edges of trays 20 and 30.

Figure 3:
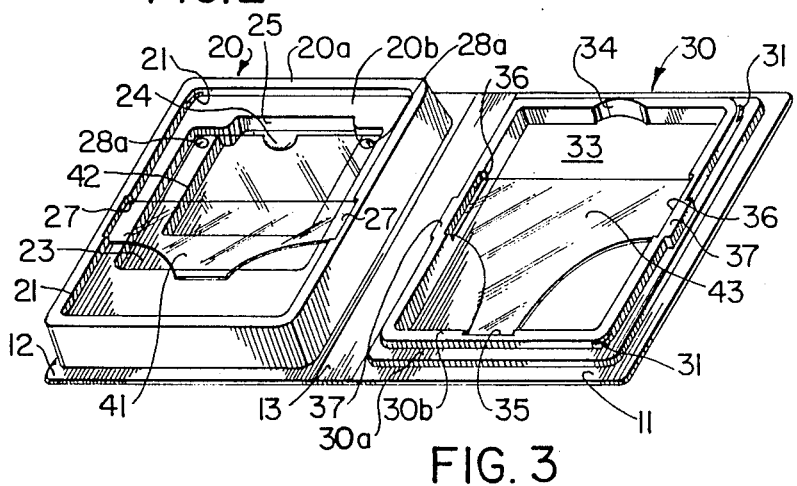
FIG. 3 illustrates the container of FIG. 2 further provided with the vinyl straps which retain the contents of the container within their respective recesses.

FIG. 3 illustrates a perspective view of the container of FIG. 2 further provided with the retaining straps referred to above. The straps 41, 42 and 43 are preferably constructed from a transparent or translucent vinyl or some similar plastic sheet. Vinyl strap 41 retains five and one quarter inch diskettes in the upper recess 23. The respective transverse ends of the retainer strap 41 extends into the opposing notches 27 in the sides of ridge 20a. The vinyl strap 41 is heat welded along the edges of its points of contact with the surface 20b. The retainer strap 42 covers the three and one half inch diskette recess 24. It is heat welded along its lower edge to the surface of recess 23 and held in place on its upper corners by Velcro (trademark) hook and loop fastener coin connectors 28a which contact the connectors 28b in recess 23 (see FIG. 2). A finger notch in the upper edge of strap 42 allows the strap to be pulled away from the Velcro (trademark) hook and loop fastener coin connectors for the removal of three and one half inch diskettes from the recess 24.

Retaining strap 43 is likewise heat welded to the bottoms of opposing notches 36 and notch 35, described in FIG. 2. Vinyl strap 43 retains documentation or other printed matter in the recess 33.

In use the container 10 (FIG. 1) is specifically designed to accommodate either five and one quarter or three and one half inch magnetic diskettes. Since both diskette sizes are in wide use, and software programs commonly run on machines having either a three and one half or a five and one quarter inch diskette drive, a need for a single container which will securely accommodate either size of diskette is satisfied by the invention. Software is almost invariably accompanied by some form of documentation. The container of the invention provides a storage and filing space for both five and one quarter and three and one half inch diskettes and any accompanying documentation. The exterior of surfaces 11, 12 and 13 (FIG. 1) of the container cover may either be printed on using silk screen techniques with a software vendor's trade information or, alternatively, may be provided with an auxiliary transparent plastic covering open along one edge to accommodate inserts printed with the vendor's trade information and any other information desirably displayed.

The present invention therefore provides a convenient, reliable and long-lasting container for either five and one quarter or three and one half inch diskettes and their accompanying documentation as well as an attractive filing and storage system for those diskettes and documentation after a user has purchased them.

I claim:
1. A container for storing and marketing at least two distinct sizes of generally flat articles such as magnetic diskettes and, optionally, printed material comprising:
   an outer cover having a pair of spaced apart panels pivotally interconnected along adjacent edges to the opposed sides of a spine member;
   a pair of shallow trays respectively secured to said panels in an opposing relationship, a first of said trays having at least two conjoined recesses adapted to simultaneously accommodate at least one of each of the distinctly sized flat articles and the second said tray optionally having at least one recess adapted to accommodate printed matter;
   retaining means to removably retain said articles in said recesses; and
   locking means to releasably lock said first tray to said second tray when said container is in a closed condition.

2. A container for storing and marketing at least two distinct sizes of generally flat articles such as magnetic diskettes and, optionally, printed material comprising:
   an outer cover having a pair of spaced apart panels pivotally interconnected along adjacent edges to the opposed sides of a spine member;
   a pair of shallow trays respectively secured to said panels in an opposing relationship, a first of said trays having at least two recesses adapted to accommodate said distinctly sized flat articles and the second said tray optionally having at least one recess adapted to accommodate printed matter; said recesses in said first tray being substantially rectangular, the smaller recess being located within the larger recess so that they share a common longitudinal centre line and a common edge along one of their ends;
   retaining means to removably retain said articles in said recesses; and
   locking means to releasably lock said first tray to said second tray when said container is in a closed condition.

3. A container for interchangeably marketing and storing at least two distinct sizes of computer diskettes and, optionally, printed documentation comprising;
   front and back supporting panels interconnected by a spine member;
   a pair of shallow trays opposingly attached to the inner surface of each said panel, one said tray having a pair of substantially rectangular recesses which share a common centre line and a common edge along their one ends, the deeper recess being adapted to accommodate a smaller magnetic diskette than the other said recess and the second said tray being provided with at least one recess adapted to accommodate printed documentation;

retaining means in the form of plastic straps attached to at least two sides of each said recess to removably retain the contents thereof; and locking means in the form of extruded ridges on the inside corner regions of a projecting ridge formed along the periphery of one said tray and complementary grooves formed in the outside corner regions of a wall adjacent an opposing complementary recessed zone along the periphery of said second tray, said ridges cooperating with said grooves to inhibit the unintentional release of said container from a closed condition.

4. A container as in claim 2 wherein said first recess is adapted to accommodate five and one quarter inch magnetic diskettes and said second recess is adapted to accommodate three and one half inch magnetic diskettes.

5. A container as in claim 2 or 4 wherein said trays are formed from vacuum molded polyvinylchloride.

6. A container as in claim 2 or 4 wherein said panels and said spine member are formed from vinyl covered thin fibrous panels.

7. A container as in claim 2 or 4 wherein said panels and said spine member are formed from vinyl covered thin fibrous panels, the outside surface of at least one of said panels being provided with a transparent plastic sheet adapted to display trade information.

8. A container as in claim 2 or 4 wherein said retaining means comprises plastic straps adapted to cover at least a portion of said recesses.

9. A container as in claim 1 wherein the edges of said one tray comprise a projecting ridge complementary with an opposed recess along the edges of the other said tray, said ridge engaging said recess in a friction fit.

10. A container as in claim 9 wherein one of said ridge or said recessed edge is provided with localized raised ridges on its vertical surface which engage complementary grooves in the opposing surface of the other said ridge or recessed edge when said container is in a closed condition.

11. A container as in claim 1 wherein said trays are formed from vacuum molded polyvinylchloride.

12. A container as in claim 1 wherein said panels and said spine member are formed from vinyl covered thin fibrous panels.

13. A container as in claim 1 wherein said panels and said spine member are formed from vinyl covered thin fibrous panels, the outside surface of at least one of said panels being provided with a transparent plastic sheet adapted to display trade information.

14. A container as in claim 1 wherein said retaining means comprises plastic straps adapted to cover at least a portion of said recesses.

* * * * *

UNITED STATES PATENT AND TRADEMARK OFFICE
CERTIFICATE OF CORRECTION

PATENT NO. : 4,869,364

DATED : September 26, 1989

INVENTOR(S) : Christopher Bray

It is certified that error appears in the above-identified patent and that said Letters Patent is hereby corrected as shown below:

Column 1, line 29:

"filling" should be --filing--.

Signed and Sealed this

Twenty-fifth Day of September, 1990

Attest:

HARRY F. MANBECK, JR.

Attesting Officer      Commissioner of Patents and Trademarks